(12) United States Patent
Teigen et al.

(10) Patent No.: US 9,158,015 B2
(45) Date of Patent: Oct. 13, 2015

(54) SEISMIC STREAMER PLATFORM

(75) Inventors: Oeyvind Teigen, Oslo (NO); Nicolas Goujon, Oslo (NO); Lars Borgen, Sande (NO)

(73) Assignee: WESTERNGECO L.L.C., Houston, TX (US)

( * ) Notice: Subject to any disclaimer, the term of this patent is extended or adjusted under 35 U.S.C. 154(b) by 1637 days.

(21) Appl. No.: 12/189,145

(22) Filed: Aug. 9, 2008

(65) Prior Publication Data

US 2009/0092006 A1 Apr. 9, 2009

Related U.S. Application Data

(60) Provisional application No. 60/977,579, filed on Oct. 4, 2007.

(51) Int. Cl.
*G01V 1/38* (2006.01)
*G01V 1/20* (2006.01)
*G01V 1/36* (2006.01)

(52) U.S. Cl.
CPC . *G01V 1/201* (2013.01); *G01V 1/36* (2013.01)

(58) Field of Classification Search
USPC ..................................................... 367/15–20
See application file for complete search history.

(56) References Cited

U.S. PATENT DOCUMENTS

| 4,955,012 | A | | 9/1990 | McMurry | |
|---|---|---|---|---|---|
| 4,979,795 | A | * | 12/1990 | Mascarenhas | 385/107 |
| 5,062,085 | A | | 10/1991 | Andrews, Jr. | |
| 2005/0073909 | A1 | * | 4/2005 | Laws et al. | 367/15 |
| 2007/0265786 | A1 | | 11/2007 | Ozdemir et al. | |
| 2008/0008034 | A1 | * | 1/2008 | Tenghamn et al. | 367/20 |

FOREIGN PATENT DOCUMENTS

| GB | 2337592 A | 11/1999 |
|---|---|---|
| GB | 2423362 A | 8/2006 |
| GB | 2430744 A | 4/2007 |

OTHER PUBLICATIONS

PCT International Search Report and Written Opinion, dated Feb. 16, 2010, Application No. PCT/US2008/072786.
Examination Report of European Application No. 08 797 607.2 dated Oct. 4, 2013: pp. 1-5.
Demetz, Sr., "Vibration noise mechanisms in streamer arrays," SEG/ New Orleans Annual Meeting, 2006: pp. 16-20.

* cited by examiner

*Primary Examiner* — Krystine Breier (57) ABSTRACT

A technique includes designing a streamer, which includes a cable and seismic sensors based at least in part on a relationship between vibration noise and a bending stiffness of the cable.

16 Claims, 8 Drawing Sheets

SEISMIC STREAMER PLATFORM

This application claims the benefit under 35 U.S.C. §119 (e) to U.S. Provisional Patent Application Ser. No. 60/977,579, entitled "Seismic Streamer Platform," which was filed on Oct. 4, 2007, and is hereby incorporated by reference in its entirety.

BACKGROUND

The invention generally relates to a seismic streamer platform.

Seismic exploration involves surveying subterranean geological formations for hydrocarbon deposits. A survey typically involves deploying seismic source(s) and seismic sensors at predetermined locations. The sources generate seismic waves, which propagate into the geological formations creating pressure changes and vibrations along their way. Changes in elastic properties of the geological formation scatter the seismic waves, changing their direction of propagation and other properties. Part of the energy that is emitted by the sources reaches the seismic sensors. Some seismic sensors are sensitive to pressure changes (hydrophones), others to particle motion (e.g., geophones), and industrial surveys may deploy only one type of sensors or both. In response to the detected seismic events, the sensors generate electrical signals to produce seismic data. Analysis of the seismic data can then indicate the presence or absence of probable locations of hydrocarbon deposits.

Some surveys are known as "marine" surveys because they are conducted in marine environments. However, "marine" surveys may be conducted not only in saltwater environments, but also in fresh and brackish waters. In one type of marine survey, called a "towed-array" survey, an array of seismic sensor-containing streamers and sources is towed behind a survey vessel.

A particular marine survey may involve towing a pressure and particle motion sensors on one or more streamers behind a surface vessel. The particular motion sensors typically are sensitive to vibration noise. In directions that are transverse to the inline axis along the streamer cable, the vibration propagates at velocities much lower than the acoustic velocity of sound in water, and therefore, the vibration noise typically has been determinative of the sensor spacing along the streamer in order to fully record seismic data that does not contain aliased vibration noise.

SUMMARY

In an embodiment of the invention, a technique includes designing a streamer, which includes a cable and seismic sensors based at least in part on a relationship between vibration noise and a bending stiffness of the cable.

In another embodiment of the invention, a technique includes determining a spacing of sensors along a cable of a streamer and based on the spacing, determining a bending stiffness for the cable such that a vibration noise is not aliased into signals that are acquired by the sensors.

In another embodiment of the invention, a technique includes spacing seismic sensors along a cable of a streamer and basing the spacing at least in part on a relationship between a vibration noise and a bending stiffness of the cable.

In another embodiment of the invention, an apparatus includes a streamer that has multi-component seismic sensors and has a bending stiffness to cause a vibration noise to not be significantly aliased into signals that are acquired by the sensors.

In yet another embodiment of the invention, an apparatus includes a streamer that has multi-component seismic sensors and a cable. The cable has a bending stiffness that is greater than approximately fifty $Nm^2$, and the sensors have a spacing that is greater than approximately fifty cm.

Advantages and other features of the invention will become apparent from the following drawing, description and claims.

DETAILED DESCRIPTION

Figure 1:
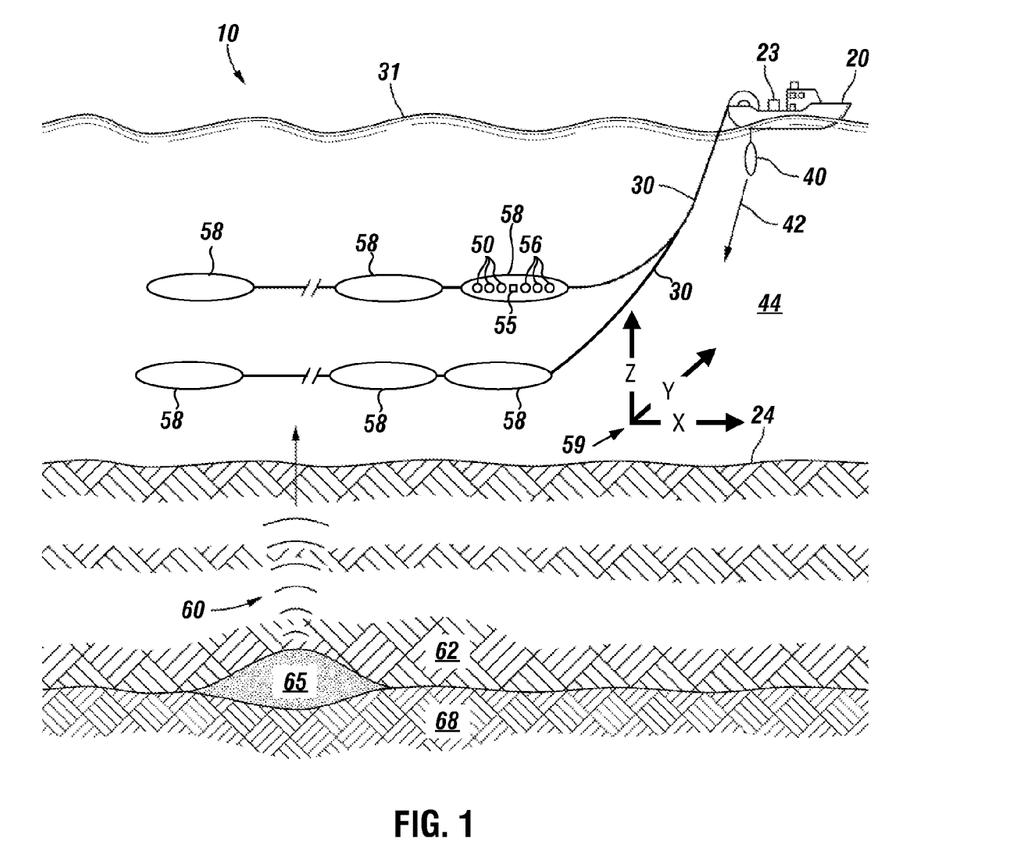
FIG. 1 is a schematic diagram of a marine seismic data acquisition system according to an embodiment of the invention.

FIG. 1 depicts an embodiment 10 of a marine seismic data acquisition system in accordance with some embodiments of the invention. In the system 10, a survey vessel 20 tows one or more seismic streamers 30 (two exemplary streamers 30 being depicted in FIG. 1) behind the vessel 20. The seismic streamers 30 may be several thousand meters long and may contain various support cables (not shown), as well as wiring and/or circuitry (not shown) that may be used to support communication along the streamers 30. In general, each streamer 30 includes a primary cable into which is mounted seismic sensors that record seismic signals.

In accordance with embodiments of the invention, the seismic sensors are multi-component seismic sensors 58, each of which is capable of detecting a pressure wavefield and at least one component of a particle motion that is associated with acoustic signals that are proximate to the multi-component seismic sensor 58. Examples of particle motions include one or more components of a particle displacement, one or more components (inline (x), crossline (y) and vertical (z) components (see axes 59, for example)) of a particle velocity and one or more components of a particle acceleration.

Depending on the particular embodiment of the invention, the multi-component seismic sensor 58 may include one or more hydrophones, geophones, particle displacement sensors, particle velocity sensors, accelerometers, pressure gradient sensors, or combinations thereof.

For example, in accordance with some embodiments of the invention, a particular multi-component seismic sensor 58 may include a hydrophone 55 for measuring pressure and three orthogonally-aligned accelerometers 50 to measure three corresponding orthogonal components of particle velocity and/or acceleration near the seismic sensor 58. It is noted that the multi-component seismic sensor 58 may be implemented as a single device (as depicted in FIG. 1) or may be implemented as a plurality of devices, depending on the particular embodiment of the invention. A particular multi-component seismic sensor 58 may also include pressure gradient sensors 56, which constitute another type of particle motion sensors. Each pressure gradient sensor measures the change in the pressure wavefield at a particular point with respect to a particular direction. For example, one of the pressure gradient sensors 56 may acquire seismic data indicative of, at a particular point, the partial derivative of the pressure wavefield with respect to the crossline direction, and another one of the pressure gradient sensors may acquire, a particular point, seismic data indicative of the pressure data with respect to the inline direction.

The marine seismic data acquisition system 10 includes one or more seismic sources 40 (one exemplary source 40 being depicted in FIG. 1), such as air guns and the like. In some embodiments of the invention, the seismic sources 40 may be coupled to, or towed by, the survey vessel 20. Alternatively, in other embodiments of the invention, the seismic sources 40 may operate independently of the survey vessel 20, in that the sources 40 may be coupled to other vessels or buoys, as just a few examples.

As the seismic streamers 30 are towed behind the survey vessel 20, acoustic signals 42 (an exemplary acoustic signal 42 being depicted in FIG. 1), often referred to as "shots," are produced by the seismic sources 40 and are directed down through a water column 44 into strata 62 and 68 beneath a water bottom surface 24. The acoustic signals 42 are reflected from the various subterranean geological formations, such as an exemplary formation 65 that is depicted in FIG. 1.

The incident acoustic signals 42 that are acquired by the sources 40 produce corresponding reflected acoustic signals, or pressure waves 60, which are sensed by the multi-component seismic sensors 58. It is noted that the pressure waves that are received and sensed by the multi-component seismic sensors 58 include "up going" pressure waves that propagate to the sensors 58 without reflection, as well as "down going" pressure waves that are produced by reflections of the pressure waves 60 from an air-water boundary 31.

The multi-component seismic sensors 58 generate signals (digital signals, for example), called "traces," which indicate the acquired measurements of the pressure wavefield and particle motion. The traces are recorded and may be at least partially processed by a signal processing unit 23 that is deployed on the survey vessel 20, in accordance with some embodiments of the invention. For example, a particular multi-component seismic sensor 58 may provide a trace, which corresponds to a measure of a pressure wavefield by its hydrophone 55; and the sensor 58 may provide one or more traces that correspond to one or more components of particle motion, which are measured by its accelerometers 50.

Figure 8:
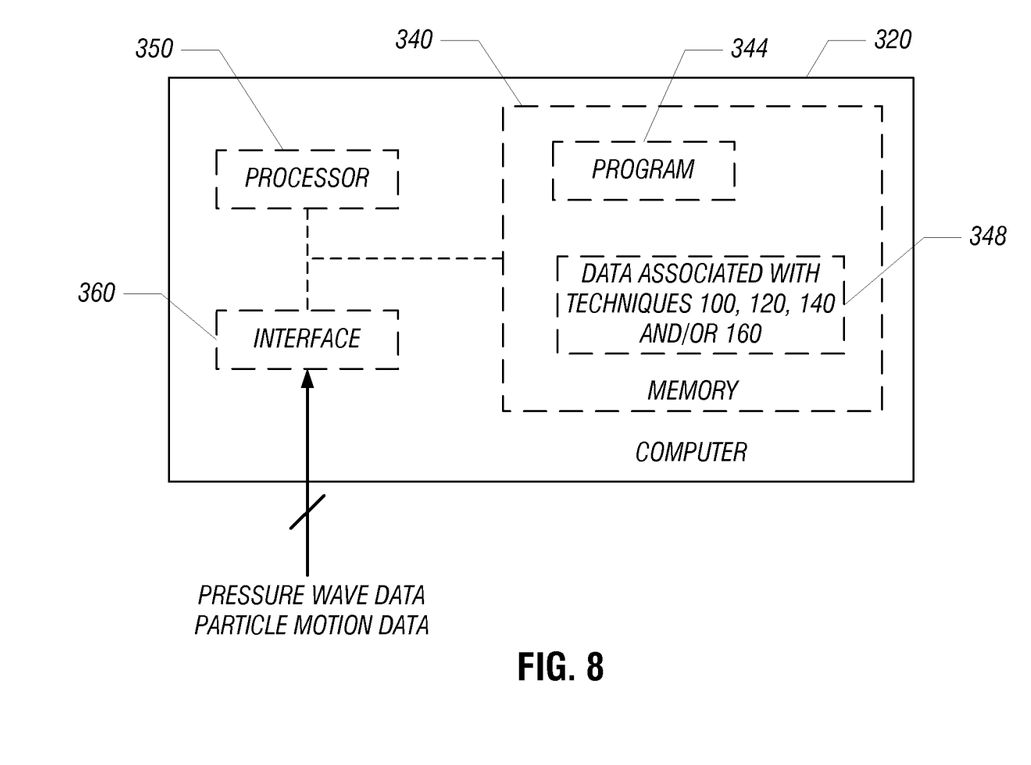
FIG. 8 is a schematic diagram of a processing system according to an embodiment of the invention.

The goal of the seismic acquisition is to build up an image of a survey area for purposes of identifying subterranean geological formations, such as the exemplary geological formation 65. Subsequent analysis of the representation may reveal probable locations of hydrocarbon deposits in subterranean geological formations. Depending on the particular embodiment of the invention, portions of the analysis of the representation may be performed on the seismic survey vessel 20, such as by the signal processing unit 23. In accordance with other embodiments of the invention, the representation may be processed by a seismic data processing system (such as an exemplary seismic data processing system 320 that is depicted in FIG. 8 and is further described below) that may be, for example, located on land or on the vessel 20. Thus, many variations are possible and are within the scope of the appended claims.

The down going pressure waves create an interference known as "ghost" in the art. Depending on the incidence angle of the up going wavefield and the depth of the streamer 30, the interference between the up going and down going wavefields creates nulls, or notches, in the recorded spectrum. These notches may reduce the useful bandwidth of the spectrum and may limit the possibility of towing the streamers 30 in relatively deep water (water greater than 20 meters (m), for example).

The technique of decomposing the recorded wavefield into up and down going components is often referred to as wavefield separation, or "deghosting." The particle motion data that is provided by the multi-component seismic sensors 58 allows the recovery of "ghost" free data, which means data that is indicative of the upgoing wavefield.

Particle motion sensors in a seismic streamer typically are sensitive to the vibration of the streamer. As a result, part of the energy that is acquired by the sensors is vibration noise, which may overlap in frequency-wavenumber (f-k) with the energy attributable to the reflected signal if measures are not taken to separate the signal from vibration noise. The vibration noise may be aliased into the signal cone, and the vibration in the transversal direction propagates at velocities much lower than the acoustic velocity of sound in water and therefore, ultimately sets the requirements for sensor spacing in order to fully record the data un-aliased.

Figure 4:
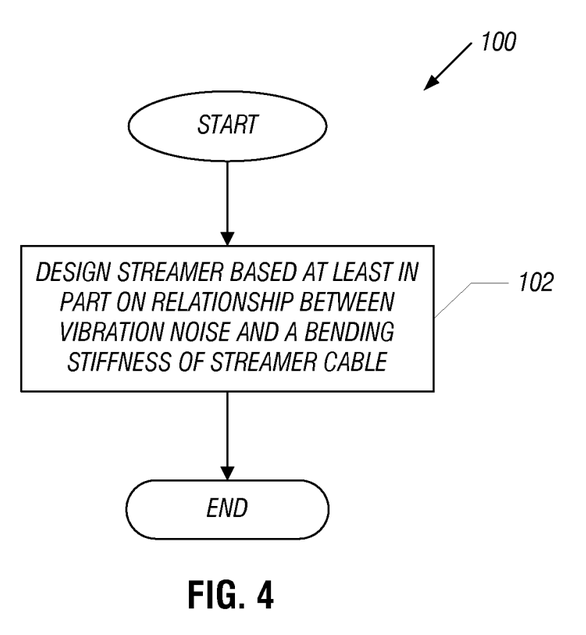
FIGS. 4, 5, 6 and 7 are flow diagrams depicting techniques to design a streamer according to embodiments of the invention.

In accordance with embodiments of the invention that are described herein, the streamer platform may be optimized for better separation between the vibration noise and the seismic signal by taking into account the bending stiffness of the streamer cable. More specifically, referring to FIG. 4, in accordance with embodiments of the invention, a technique 100 includes designing (block 102) a streamer based at least in part on the relationship between the vibration noise and a bending stiffness of the streamer cable.

By increasing the bending stiffness in the streamer cable, the propagating velocity of transversal waves in the streamer cable also increases. Therefore, a larger bending stiffness allows for a larger sensor spacing without aliasing the vibration noise into the acquired seismic signal. As described further below, the seismic sensors can be rigidly attached to the streamer cable for the purpose of recording the vibration noise and its coherence so that the noise may be filtered out from the data set in later processing.

Figure 2:
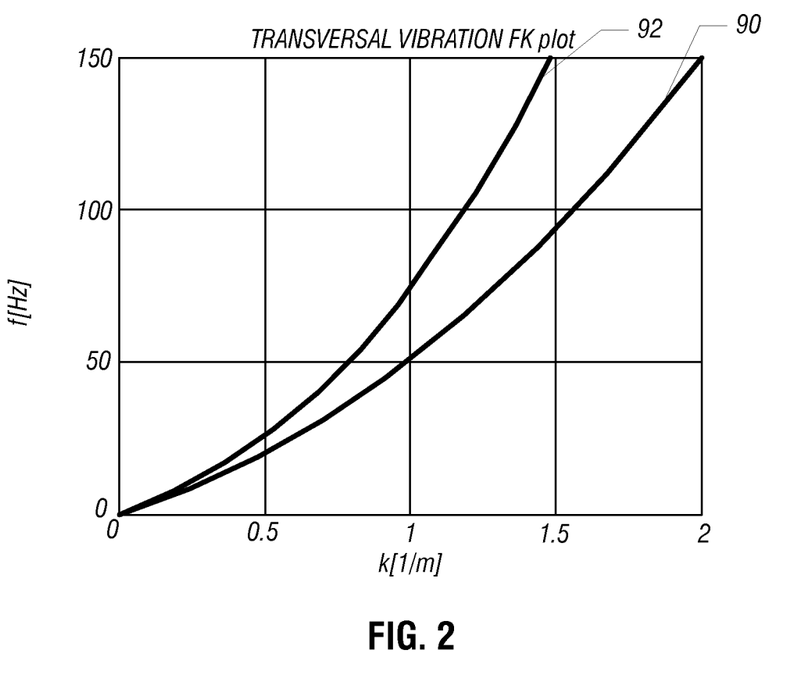
FIG. 2 is a frequency-wavenumber plot illustrating vibration energy acquired by streamers that have different bending stiffnesses.

FIG. 2 is a frequency-wavenumber (f-k) plot illustrating the energy generated due to the transversal vibration of two streamers that have different bending stiffnesses. In particular, a plot 90 depicts the energy generated due to transversal vibration by the streamer that has a first bending stiffness; and a plot 92 depicts energy that is generated due to transversal vibration by a streamer that has a bending stiffness that is four times greater than the bending stiffness of the first streamer. As can be seen, the larger bending stiffness is associated with a larger propagating velocity, which further separates any aliased vibration noise from the acquired seismic signal.

Figure 3:
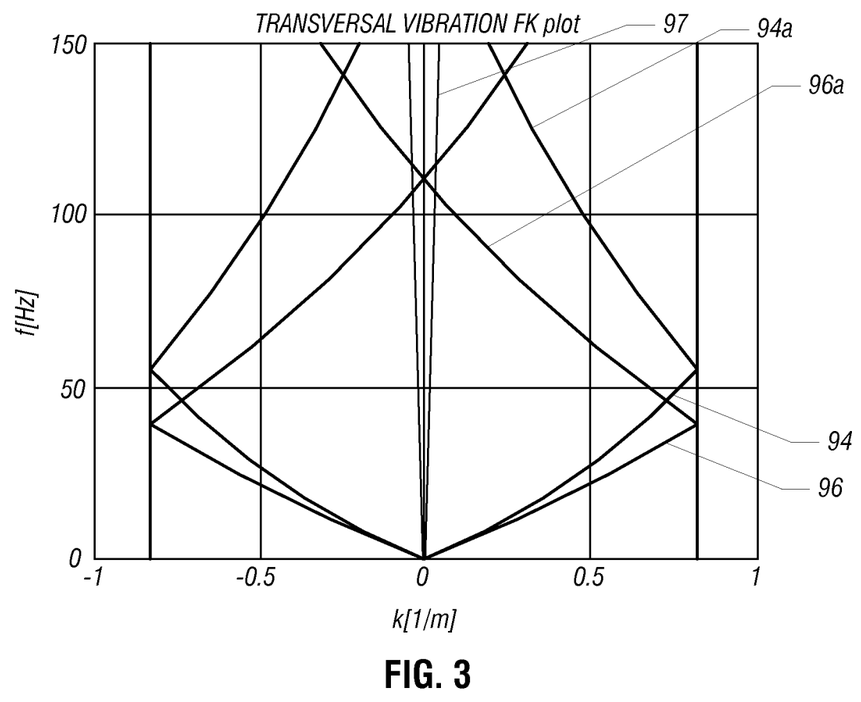
FIG. 3 is a frequency-wavenumber plot of vibration noise and signal energy acquired by streamers that have different bending stiffnesses.

To further illustrate the separation, FIG. 3 depicts plots 94 and 96 of the vibration noise acquired by a streamer (plot 94) that has a significantly bending stiffness than another streamer (plot 96). The streamer that has the lower bending stiffness has an aliased segment 96a that appears in a signal cone 97 above approximately 110 Hertz (Hz). However, an aliased portion 94a, which is associated with the streamer cable that has the larger bending stiffness, is outside of the signal cone 97.

Bending stiffness refers to the streamer cable's ability to resist bending, and may be expressed as "EI," where "E" represents a material's Young's modulus, and "I" represents the second area of moment in the cross-section around the axis of interest. Adopting the three-dimensional (3-D) coordinate system depicted by the axes 59 of FIG. 1, the x axis refers to an axis in the inline direction of the streamer cable, the y axis refers to the axis along the crossline direction to the streamer, and z axis refers to the axis in the vertical direction.

The bending stiffness, for this orientation, is calculated in the y-z plane around the axis of interest. The bending stiffness of the cross-section is fully specified by calculating the stiffness around the y and z axes.

The second area of moment for a massive cylinder is uniform in any direction in the cross-section and may be described as follows:

$$I = \frac{\pi d^4}{64}, \quad \text{Eq. 1}$$

where "d" represents the diameter of the cross-section.

By calculating the bending stiffness, it is possible to relax the sampling requirement that is otherwise imposed to address transversal vibration. The bending stiffness that is needed for recording un-aliased noise at a particular sampling interval may be found, as examples, analytically, numerically or by any other technique, as can be appreciated by one of skill in the art.

As a more specific example, in accordance with some embodiments of the invention, the bending stiffness may be modeled by the following mathematical description for a tensioned beam:

$$EI\frac{\partial^4 y(x, t)}{\partial x^4} - T\frac{\partial^2 y(x, t)}{\partial x^2} + \rho \ddot{y}(x, t) = 0, \quad \text{Eq. 2}$$

where "EI" represents the bending stiffness, "T" represents the tension of the streamer cable, "ρ" represents the density, "x" represents the inline coordinate, and "y(x,t)" represents the crossline amplitude of the vibration as a function of space and time.

The bending stiffness may be changed by, but not limited to, altering Young's modulus, varying the streamer cable diameter and/or varying the cross-sectional shape of the streamer cable, as just a few examples.

The use of a relatively high bending stiffness allows a relatively large sensor spacing (a spacing of equal to or greater than approximately 50 centimeters (cm), for example) without aliasing the vibration noise. As a more specific example, in accordance with some embodiments of the invention, the bending stiffness for a streamer having a diameter of 50 millimeters (mm) may be in the range of approximately 50 Newtons meter squared ($Nm^2$) to approximately 500 $Nm^2$; and in other embodiments of the invention, for a streamer having a diameter of 60 mm, the bending stiffness may be in the range of approximately 100 $Nm^2$ to approximately 1000 $Nm^2$.

Depending on the particular embodiment of the invention, the multi-component sensors may be wired together in an array so that each trace corresponds to an analog sum of multiple sensors, or alternatively, each sensor may provide a trace that is recorded. For embodiments of the invention in which each sensor provides a trace that is recorded, digital filtering may be used for purposes of removing vibration noise. For embodiments of the invention in which the sensors are wired in an array, the vibration noise is attenuated by summing a number of sensors within the array (k filtering), while the signal is preserved because of its longer apparent wavelength. Within an array of sensors of a given length, a high bending stiffness allows for a smaller number of sensors, as the smallest wavelength to be filtered is longer as compared to a platform that has a smaller bending stiffness.

Figure 5:
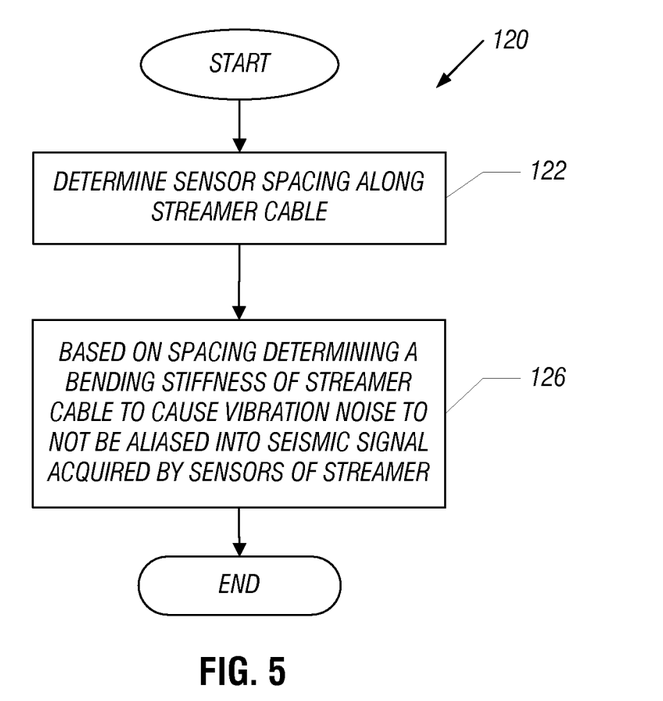

Thus, referring to FIG. 5, in accordance with some embodiments of the invention, a technique 120 to design a seismic streamer platform includes determining (block 122) a sensor spacing along a streamer cable and based on the spacing, determining (block 126) a bending stiffness of the streamer cable to cause vibration noise to not be aliased into the seismic signal that is acquired by the sensors of the streamer.

Figure 6:
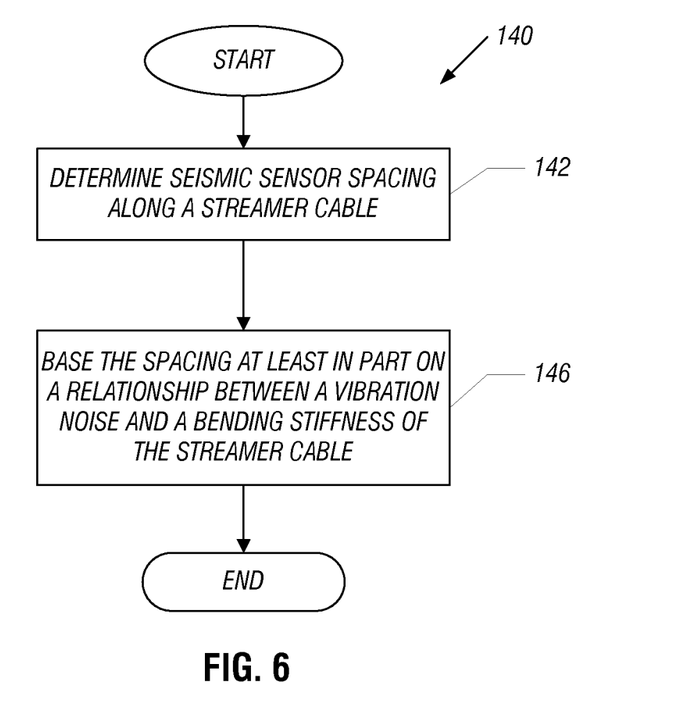

It is noted that many variations are contemplated and are within the scope of the appended claims. For example, instead of first determining the sensor spacing, the bending stiffness of the streamer cable may first be determined and based on the stiffness, the sensor spacing may be calculated. Therefore, according to a technique 140 that is depicted in FIG. 6, a seismic sensor spacing may first be determined along a streamer cable, pursuant to block 142. The spacing is based at least in part on a relationship between a vibration noise and a bending stiffness of the streamer cable, pursuant to block 146.

Figure 7:
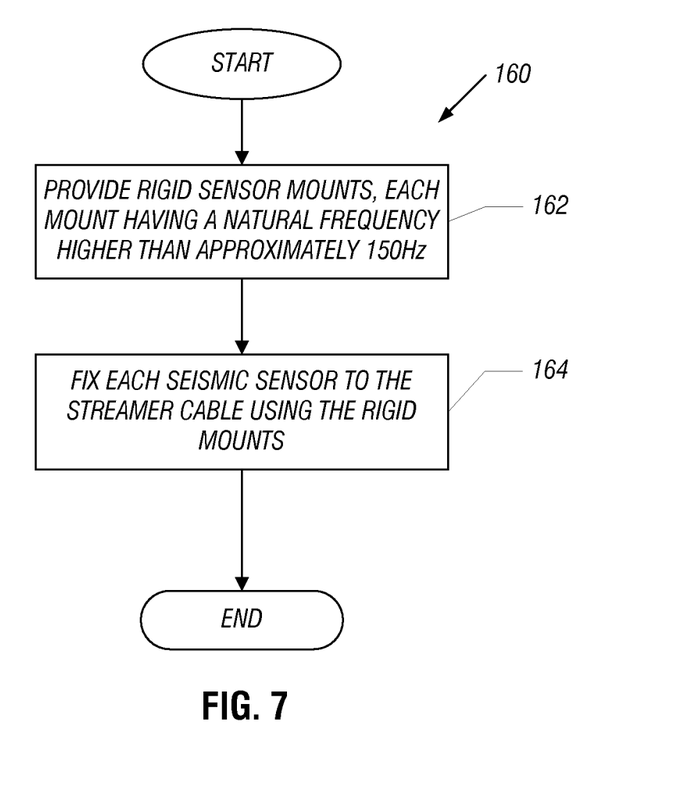

In accordance with some embodiments of the invention, the seismic sensors are fixed to the streamer for the purpose of recording the vibration of the streamer as accurately as possible. For making the filtering most effective in this regard, the seismic sensors may be "rigidly" fixed by such means as gluing, welding, potting, casting, o-rings or by any other technique that provides such a rigid mount. In this context, the rigidity of the mount may be specified by its natural frequency, which is higher than 150 Hz. Thus, referring to a technique 160 that is depicted in FIG. 7, rigid mounts are provided (block 162) for mounting seismic sensors to a streamer cable. Each mount has a natural frequency greater than 150 Hz, pursuant to block 164.

Referring to FIG. 8, in accordance with some embodiments of the invention, a seismic data processing system 320 may perform the techniques that are disclosed herein for purposes of providing removing vibration noise. In accordance with some embodiments of the invention, the system 320 may include a processor 350, such as one or more microprocessors and/or microcontrollers. The processor 350 may be located on the streamer 30 (FIG. 1), located on the vessel 20 or located at a land-based processing facility (as examples), depending on the particular embodiment of the invention.

The processor 350 may be coupled to a communication interface 360 for purposes of receiving seismic data that corresponds to pressure and particle motion measurements. Thus, in accordance with embodiments of the invention described herein, the processor 350, when executing instructions stored in a memory of the seismic data processing system 320, may receive multi-component data that is acquired by multi-component seismic sensors while in tow. It is noted that, depending on the particular embodiment of the invention, the multi-component data may be data that is directly received from the multi-component seismic sensor as the data is being acquired (for the case in which the processor 350 is part of the survey system, such as part of the vessel or streamer) or may be multi-component data that was previously acquired by the seismic sensors while in tow and stored and communicated to the processor 350, which may be in a land-based facility, for example.

As examples, the interface 360 may be a USB serial bus interface, a network interface, a removable media (such as a flash card, CD-ROM, etc.) interface or a magnetic storage interface (IDE or SCSI interfaces, as examples). Thus, the interface 360 may take on numerous forms, depending on the particular embodiment of the invention.

In accordance with some embodiments of the invention, the interface 360 may be coupled to a memory 340 of the seismic data processing system 320 and may store, for example, various data sets involved with the techniques 100, 120, 140 and/or 160, as indicated by reference numeral 348. The memory 340 may store program instructions 344, which when executed by the processor 350, may cause the processor 350 to perform one or more of the techniques that are disclosed herein, such as the techniques 100, 120, 140 and/or 160, as examples.

While the present invention has been described with respect to a limited number of embodiments, those skilled in the art, having the benefit of this disclosure, will appreciate numerous modifications and variations therefrom. It is intended that the appended claims cover all such modifications and variations as fall within the true spirit and scope of this present invention.

What is claimed is:

1. An apparatus comprising:
a streamer having multi-component seismic sensors and having a bending stiffness greater than fifty $Nm^2$ to cause a vibration noise to not be significantly aliased into signals acquired by the sensors.

2. The apparatus of claim 1, wherein the streamer cable has a diameter of substantially fifty millimeters and the determined bending stiffness is in a range from fifty $Nm^2$ to five hundred $Nm^2$.

3. The apparatus of claim 2, wherein the streamer cable has a diameter of substantially sixty millimeters and the determined bending stiffness is in a range from one hundred $Nm^2$ to one thousand $Nm^2$.

4. The apparatus of claim 1, wherein the multi-component seismic sensors comprise particle motion and pressure sensors.

5. The apparatus of claim 1, further comprising a processor to process data acquired by the sensors.

6. The apparatus of claim 5, wherein the processor is attached to the streamer.

7. The apparatus of claim 1, further comprising:
a survey vessel to tow the streamer.

8. The apparatus of claim 7, further comprising:
a processor located on board the survey vessel, the processor adapted to process data acquired by the sensors.

9. An apparatus comprising:
a streamer having multi-component seismic sensors and a cable,
wherein the cable has a bending stiffness greater than fifty $Nm^2$ and the sensors having a spacing greater than fifty centimeters.

10. The apparatus of claim 9, wherein the cable has a diameter of substantially fifty millimeters, and the bending stiffness is in a range from fifty $Nm^2$ to five hundred $Nm^2$.

11. The apparatus of claim 9, wherein the cable has a diameter of substantially sixty millimeters, and the bending stiffness is in a range from one hundred $Nm^2$ to one thousand $Nm^2$.

12. The apparatus of claim 9, wherein the multi-component seismic sensors comprise particle motion and pressure sensors.

13. The apparatus of claim 9, further comprising a processor to process data acquired by the sensors.

14. The apparatus of claim 13, wherein the processor is attached to the streamer.

15. The apparatus of claim 9, further comprising:
a survey vessel to tow the streamer.

16. The apparatus of claim 15, further comprising:
a processor located on board the survey vessel, the processor adapted to process data acquired by the sensors.

* * * * *